Nov. 28, 1939.　　R. D. BATEMAN　　2,181,797
AUTOMATIC CLUTCH MECHANISM
Filed Nov. 12, 1937　　2 Sheets-Sheet 1
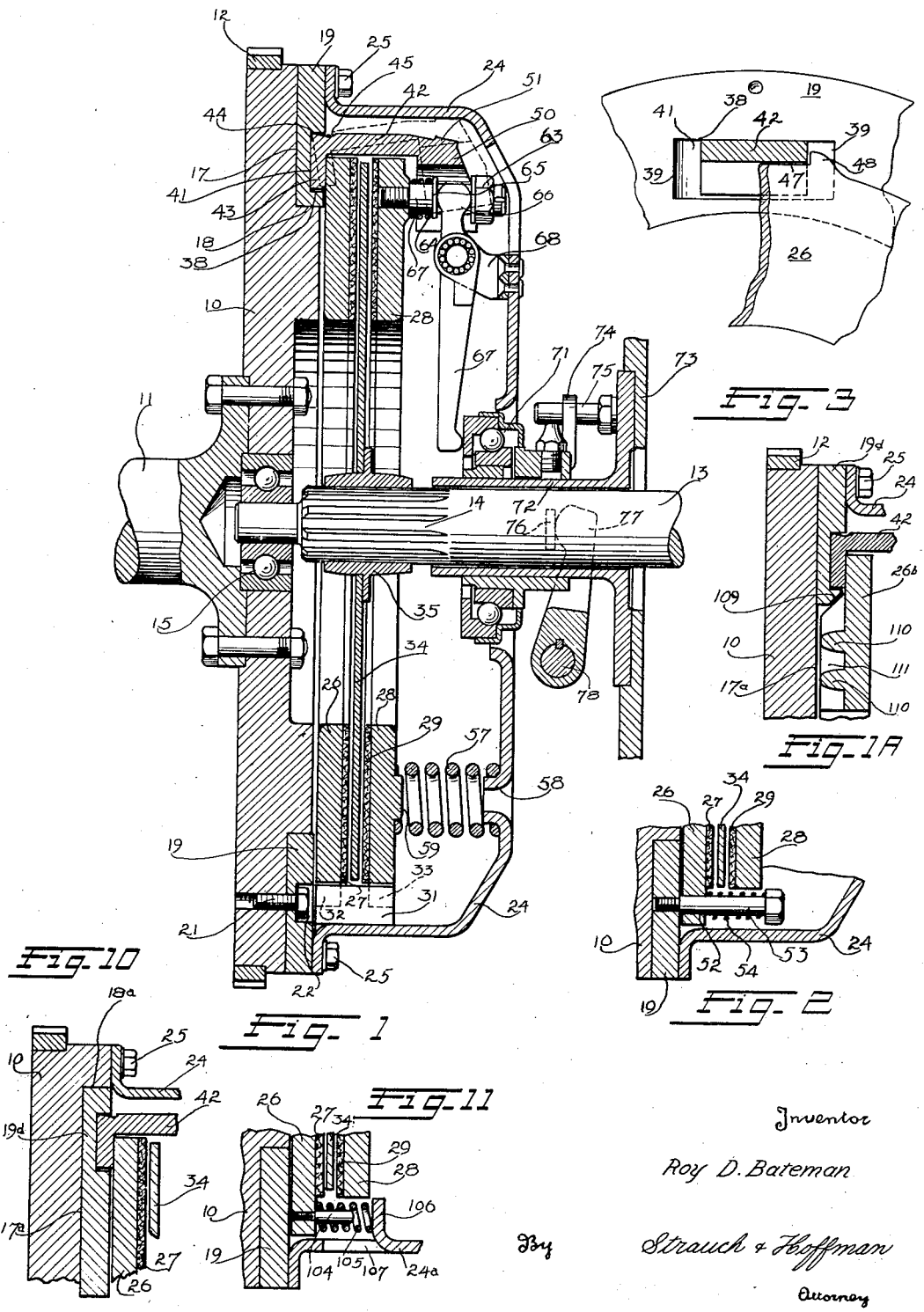
Inventor
Roy D. Bateman
By Strauch & Hoffman
Attorney

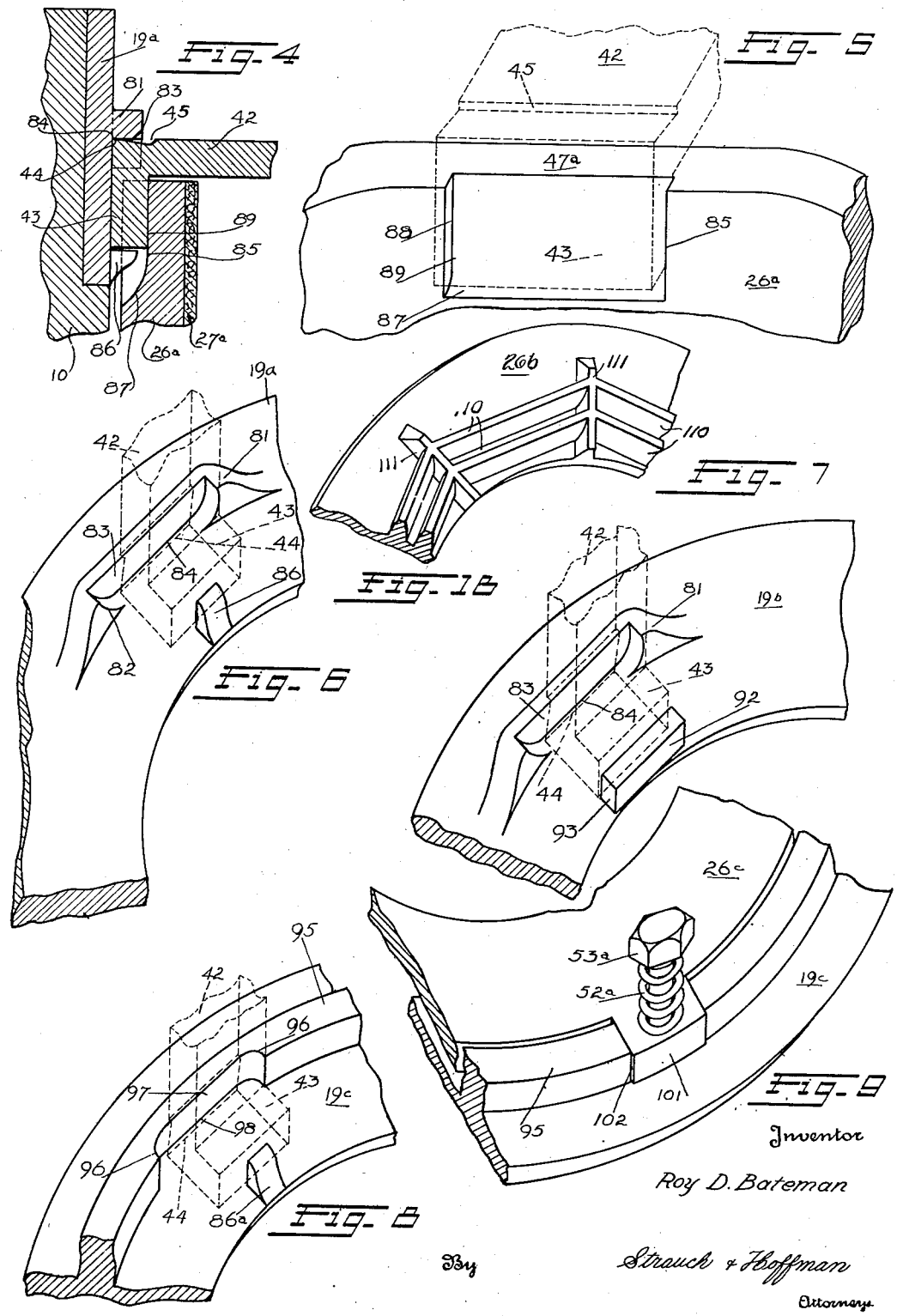

Patented Nov. 28, 1939

2,181,797

UNITED STATES PATENT OFFICE 2,181,797

AUTOMATIC CLUTCH MECHANISM

Roy D. Bateman, Washington, D. C., assignor to Automatic Drive and Transmission Company, Ossining, N. Y., a corporation of New Jersey Application November 12, 1937, Serial No. 174,252

11 Claims. (Cl. 192—105)

The present invention relates to automatic clutches and it is particularly concerned with clutches embodying centrifugally operable weights for bringing the plates into frictional driving engagement.

Many of the centrifugal clutches heretofore proposed, have required that extensive machining and other accurate operations be performed upon the flywheel, which has seriously militated against their adoption as so-called "replacement" clutches and has also made it difficult to commercialize them as original equipment in automotive vehicles. Other so-called "unit" centrifugal clutches have also been proposed and are adapted to be bolted directly to the flywheel but most of them have proved unsatisfactory through defective design or failure to perform all of the functions required of an automotive clutch.

It is, accordingly, a primary object of this invention to provide a novel unitary centrifugal clutch that may be bolted directly to the existing flywheels of automotive vehicles without requiring removal of the flywheel for accurate and time consuming machinery work.

A further important object is to devise a unitary centrifugal clutch which may be completely finished and set up and tested prior to installation on the flywheel of existing automotive vehicles and contains within itself the only parts which must be accurately formed, thereby making it unnecessary to remove the flywheel and perform costly machining or other operations thereupon.

Another object is to provide a novel centrifugal clutch embodying weight levers whose axes remain in a fixed plane as they rock outwardly in response to centrifugal force and which is completely contained in a cover and base plate assembly which may be secured to the flywheels of existing automotive vehicles.

A further object is to devise novel centrifugal lever and plate assemblies for automatic clutches and to also provide improvements and refinements of subordinate features of centrifugal clutches, such as keying means for the driving plates, retracting spring assemblies for the automatic plate and manufacturing details of the various parts making up the clutch.

Further objects of the invention will become apparent as the specification thereof proceeds in connection with the annexed drawings, and from the appended claims. In the drawings:

Figure 1 is a longitudinal sectional view through a clutch embodying the invention;

Figure 1A is a similar view of a modified flywheel and plate assembly.

Figure 1B is a perspective view of the inner surface of the driving plate shown in Figure 1A.

Figure 2 is a fragmental sectional view of the clutch shown in Figure 1 and illustrates one of the holdback assemblies for retracting the automatic plate;

Figure 3 is a fragmental view of the base plate and the automatic plate of the device shown in Figure 1 and illustrates the manner in which the centrifugal weights cooperate with the base plate and the automatic plate;

Figure 4 is a fragmental sectional view of the flywheel, the base plate, and the automatic plate of a modified form of the invention;

Figure 5 is an isometric view looking at the bottom of the automatic plate of the device shown in Figure 4, and illustrates the centrifugal weight lever in phantom lines in order to show the manner in which it cooperates with the recess in the automatic plate.

Figure 6 is a fragmental perspective view of the base of a modified form of plate;

Figure 7 is a view similar to Figure 6 but illustrates a still further modified form of base plate;

Figure 8 is a view similar to Figures 6 and 7 and shows a still further modified form of base plate;

Figure 9 is a fragmental perspective view illustrating the manner in which the automatic plate is related to the base plate in the form of invention shown in Figure 8;

Figure 10 is a fragmental longitudinal sectional view of a modified form of base plate and flywheel assembly; and Figure 11 is a fragmental sectional view similar to Figure 2, but shows a modified form of retracting spring assembly for the automatic plate.

With continued reference to the drawings, wherein like reference characters have been employed to designate like parts throughout the several views thereof, and referring particularly to Figures 1, 2 and 3, there is illustrated a flywheel 10 secured to a driving shaft 11 and having the usual starter ring gear 12 provided thereon. A driven shaft 13 is provided with a splined portion 14 and is journaled in the flywheel web at its front end in an antifriction bearing 15 in conventional manner. Shaft 13 in the illustrated embodiment is journaled in a transmission case (not shown).

Flywheel 10 is provided with a preferably flat bearing surface 17 and a preferably cylindrical piloting surface 18. An annular plate 19, which will be hereinafter termed the "base plate", is snugly piloted on surface 18 and firmly engages bearing surface 17. Plate 19 is secured to the flywheel in any suitable manner, preferably by a plurality of cap screws 21 having their heads located in counter-sunk recesses 22 in the base plate.

Flywheel 10, aside from the provision of surfaces 17 and 18, may be considered as conventional in form. Therefore, if it is desired to convert a conventional manual clutch into an automatic clutch, the flywheel may be turned down in a lathe or the like to provide a pair of surfaces similar to surfaces 17 and 18 as shown in Figure 1.

A cover 24, preferably of pressed steel, and having a closed bottom and a flange, is secured to base plate 19 by means of a plurality of cap screws 25 and contains the mechanism that will be described now.

Located within cover 24 is an automatic plate 26 having friction facings 27, and a manual plate 28 having friction facings 29. Plates 26 and 28 are preferably coupled to the flywheel for synchronous rotation therewith by means of a plurality of block-like keys 31, which are welded or otherwise suitably secured to the interior of cover 24 and they fit between spaced pairs of driving lugs 32 and 33 formed on plates 26 and 28 respectively.

Disposed between, and frictionally cooperating with the automatic and manual plates is a driven disk 34 which is carried by a hub 35, which in turn is splined upon shaft 13.

The friction facings 27 and 29 are preferably carried by the driving plates in order to reduce the inertia of plate 34, thereby reducing the "spin" of the driven shaft when the clutch is disengaged during gear shifting operations. The clutch facings also are preferably of metal composition, for instance, colloidally dispersed graphite and copper; and it has been found most advantageous to secure them to the driving plates in the form of segments with spaces between the neighboring edges of the segments so as to provide substantially radial passages which induce cooling air currents to progressively pass over the faces of disc 34, even when it is engaged with the segments, as illustrated in Patent No. 2,107,954 to Wade D. Morton and William E. Haupt, dated February 8, 1938.

Automatic plate 26 is actuated by a plurality of centrifugal weights to be now described. With reference to Figure 3, base plate 19 is provided with a recess 38 and as the recess illustrated was formed by a milling cutter it provides a pair of curved end surfaces 39, and a flat intermediate portion 41, which is of considerable area and constitutes the "working" portion of the recess.

Disposed in each recess 38 is a centrifugal weight lever 42, which is provided with a radially directed foot portion 43 having a knife edge fulcrum 44 at its outer edge. The outer side of the foot portion is also provided with a beveled portion 45 in order to allow the weight to swing outwardly without interference with the outer wall of recess 38.

As seen in Figure 1, each weight lever seats squarely upon the flat bottom 41 of recess 38, and abuts automatic plate 26. As seen in Figure 3, the automatic plate is provided with a straight, chordally disposed outer edge 47 adjacent the weight lever, and terminates at either end in an ear 48. In view of the fact that recess 38 is larger than the foot portion of the weights, the weights could shift in a chordal direction but for ears 48, which cooperate with the sides of each lever to keep it in the proper position in each recess 38. Also, by providing a straight outer edge 47 adjacent each weight lever, the plate is of maximum strength and hence may adequately resist the distorting forces set up through operation of the weights.

As seen in Figure 1, weight levers 42 terminate at their free ends in weight portions 50 adjacent the closed end of the cover, and they are of bifurcated form so as to avoid interference with the throwout mechanism that will be described hereinafter. Each weight portion is provided with a bearing seat 51 adapted to cooperate with the inner wall of cover 24 when the weights attain their outermost positions, and it is preferably of curved configuration having a radius of curvature equal to the radius of curvature of the inner wall of the cover, in order to evenly distribute the forces developed in the centrifugal weights.

Referring to Figure 2, the automatic plate, intermediate the weights and keys, is provided with a plurality of lugs having apertures 52. Extending through each aperture 52 is a bolt 53 which is threaded into plate 19 and is provided with a shoulder which bears against the base plate. A compression spring 54 encircles each bolt or stud member 53 and reacts against the head of the bolt so as to bear against the automatic plate and urge it resiliently towards the flywheel.

It is, accordingly, apparent that when the flywheel is stationary or is rotating at a predetermined idling speed, retracting springs 54 will firmly clamp the feet of the centrifugal levers between the automatic plate and the recesses in the base plate and hold the weight levers in the retracted position shown in Figure 1. When the flywheel is accelerated to a predetermined speed in excess of idling speed, weights 42 will rock outwardly about their knife edges 44 as axes, and portions 43 thereof will force plate 26 to the right against the action of spring 54, and when their maximum swing has been attained they will assume the dotted line position shown in Figure 1 with face 51 engaging the inner wall of cover 24. The centrifugal weights are, accordingly, stopped at a predetermined point thereby predetermining the pressure they may build up between the clutch plates, and also preserving proper dynamic balance of the clutch mechanism.

A plurality of compression springs 57 encircle embossed portions 58 of the clutch cover, and they bear against clutch plate 28. Springs 57 are preferably centered on the clutch plate by bosses 59. Springs 57 are analogous to the "pressure" springs of a conventional manual clutch and their action is controlled by a throwout mechanism which may be considered as of conventional form.

Referring to Figure 1, a plurality of shouldered studs 62 are threaded into plate 28 and nuts 63 are threaded thereon. A compression spring 64 encircles each stud 62 and urges a washer 65 towards the bifurcated outer end 66 of a plurality of throwout levers 67, which are journalled on brackets 68 carried by the clutch cover. As seen in Figure 1, clockwise rocking movement of levers 67 will cause the bifurcated outer ends thereof to engage nuts 63, and through stud 62 will move plate 28 to the right against the action of springs 57.

Weight levers 42 are preferably, though not necessarily, three in number and are located 120° apart, in order that retracting springs 54 may urge plate 26 into position on a stable three-point support. Throwout levers 67 and the associated parts are also preferably three in number and disposed at 120°, whereas springs 57 may be of any desired number but are preferably located in equal groups between the three throwout lever assemblies.

The levers 67 are controlled by a conventional throwout bearing assembly 71 which may assume any desired form, and it is mounted for sliding axial movement on a supporting sleeve 72 carried by a clutch housing 73 or any other suitable part. The throwout bearing assembly carries an apertured arm 74 which is received over a guiding stud 75 for preventing rotation of the stationary parts of the throwout bearing assembly. The throwout bearing assembly is also provided with a pair of lugs 76 which cooperate with a throwout fork 77 mounted on a throwout shaft 78.

A releasable latch mechanism (not shown) is associated with the shaft 78 for holding it in the intermediate automatic position illustrated in Figure 1, so that when the engine is stationary or is operating at idling speed, the plates are disengaged as shown in Figure 1. It is apparent that by releasing the latch, springs 57 may urge plate 28 to the left and clamp driven member 34 between it and driving plate 26 because the throwout bearing assembly may move to the right when the latch is released and allow throwout lever 67 to undergo counter-clockwise rocking movement as seen in Figure 1.

Assuming that the engine is operating at idling speed, and that the throwout mechanism is held in automatic position as previously described, the parts assume the disengaged position shown in Figure 1. When the engine is accelerated to speeds in excess of idling speeds; namely, to a predetermined engaging speed, weight levers 42 fulcrum outwardly about their knife edges 44 and the inner ends of foot portions 43 cause plate 26 to move to the right against the action of springs 54, as previously set forth. When plate 26 contacts disk 34 the latter will be displaced freely to the right by reason of the splined hub 35, and when the disk is firmly clamped between plates 26 and 28 the clutch starts to transmit torque and the magnitude of torque increases as the engine is accelerated. Further outward swing of weight levers 42 in response to further acceleration of the engine results in the entire driven plate assembly shifting to the right against the action of springs 57. Therefore the plates are forced together under a yielding engagement pressure by reason of springs 57 and the load is picked up smoothly without shock. When the engine attains a predetermined fully engaged position, weight levers 42 bring their surfaces 52 into engagement with the inner wall of the cover, and thereafter further increases in the speed will not produce any further increase in the final clutch pressure. The parts are so designed that when the fully engaged position of the centrifugal weights has been attained the clutch plate pressure is sufficiently high to prevent slippage between the plates, even at the full torque of the engine.

It should also be observed that when the clutch is engaged centrifugally as previously described, plate 28 moves to the right and in so doing springs 64 cause levers 67 to rock clockwise and thereby bring their inner ends free from engagement with the throwout bearing. Therefore the throwout bearing only operates when the engine is idling or when the clutch pedal is depressed to disengage the clutch.

When the clutch is fully engaged as just described with the weight levers in engagement with the cover, and it is desired to disengage the clutch, the clutch pedal provided on shaft 78 may be depressed to effect counter-clockwise rocking movement of the shaft 78 so as to rock levers 67 clockwise and retract plate 28 to the right against the action of the springs 57 and thereby relieve the plates of pressure. It will be observed that when this action takes place, plate 26 will remain in its advanced position away from flywheel 10 by virtue of the fact that the weight levers can move it no further to the right.

Assuming that the clutch is fully engaged with weight levers 42 in engagement with the clutch cover, when the engine is decelerated and it attains the predetermined disengaging speed, retracting springs 54 will return plate 26 and weight levers 42 to the positions shown in Figure 1, thereby disengaging the clutch.

It is, accordingly, seen that the invention provides a unitary clutch that may be bolted directly to conventional flywheels and requires a minimum of changes in the form of the flywheel. Also, the only parts requiring accurate machining are those located in the cover and they may be completely finished and assembled in the factory and the clutch mounted as a unit on a rotatable fixture and tested and balanced before it is shipped. The clutch is readily disassembled by removing nuts 63 and cap screws 25, which allows the cover, the pressure spring and the throwout levers to be removed as a unit. Bolts 53 may then be removed to relieve plate 26 of pressure and allow it to be separated from the base plate and free the centrifugal levers.

Referring now to Figures 4, 5 and 6 I have shown a modified form of base plate and automatic plate assembly forming part of the invention, and with particular reference to Figure 4 base plate 19a is secured to flywheel 10 in the manner previously described but it is not provided with recesses as in the first form of the invention. In this construction, a plurality of bosses 81 are formed on plate 19a equal in number to the number of weights employed.

As seen in Figure 6, bosses 81 are formed by a milling cutter operation, as indicated at 82, to provide a flat wall 83 which joins the surface of plate 19a along a straight line 84. The face of plate 19a and surface 83, accordingly, define a dihedral angle for the reception of the feet of weight levers 42, which have been indicated in phantom lines in Figure 6. Weight levers 42, accordingly, seat flat against the surface of plate 19a and their knife edges 44 seat at the junction 84 of wall 83 and the face of the plate. Weight levers 42 may, accordingly, fulcrum upon the surface of plate 19a above their knife edges as axes in the same manner as they did in the recesses provided in plate 19 of the form of invention illustrated in Figure 1.

Also preferably cast on plate 19a, are a plurality of lugs 86 which have a preferably machined outer surface for accurate cooperation with the inner ends of foot portions 43 of weight levers 42, so as to prevent inward movement of the weight levers or twisting thereof.

In this form of the invention, foot portions 43 of the weight levers seat in the recesses 85 formed in automatic plate 26a. The recesses may be formed in any suitable manner, but those illustrated have been formed by a milling cutter, and hence the recesses provide a rounded surface 87, flat side walls 88 and a flat bearing surface 89.

By providing recesses in the automatic plate for the weight levers, the automatic plate may be made considerably thicker and stronger, and at the same time it is unnecessary to employ lugs 48 on plate 26 as in the invention shown in Figure 3 to prevent lateral shift of the levers, because the levers are so dimensioned as to have a width slightly less than the spacing of side walls 88, with the result that the side walls 88 prevent the weights from shifting any substantial amount in a chordal direction, and yet they permit fulcrum 44 of each weight to find an accurate seat at the apex 84 of the surfaces forming the bearing. This form of invention functions in the same way as the form first described and it is apparent that by reason of the nesting of automatic plate 26a within lugs 81 the entire mechanism is very compact and yet thoroughly efficient.

With reference to Figure 7, I have illustrated a modified form of base plate 19b which is in all respects similar to plate shown in Figures 4, 5 and 6 with the exception that the rectangular key member 92 is formed thereon. However, if desired it may be made of steel and welded to base plate 19b. Key member 92 is provided with accurately formed end walls 93 and is of sufficient length to provide a snug sliding fit between the two end walls 88 of recesses 85, so that when the parts are assembled faces 93 of the keys cooperate with walls 88 and couple automatic plate 26a to base plate 19b for synchronous rotation and yet permit limited axial movement of the parts for clutching and declutching purposes. It is, accordingly, seen that in this form of invention it is unnecessary to employ the block 31 shown in Figure 1 to key plate 26 to the flywheel. Block 31 may be, accordingly, made shorter and only need cooperate with plate 28.

Referring to Figures 8 and 9 of the drawings, I have shown a further modified form of automatic and base plate assembly forming part of the invention. In this form of the invention, plate 19c is provided with an axially directed flange 95. Flange 95 is shown as operated on by a milling cutter so as to provide a pair of curved surfaces 96 joined by a flat surface 97 which merges with the flat surface of plate 19c along a straight line 98, so as to provide an accurate bearing surface for knife edge 44 of each centrifugal weight lever 42, one of which is shown in Figure 8, dotted lines as being associated with the base plate.

Base plate 19c is also provided with a lug 86a for cooperation with the inner end of foot portion 43 of the centrifugal weight levers in a manner similar to that described in connection with Figures 4, 5 and 6. In this form of the invention it is unnecessary to employ block 31 for keying automatic plate 26c to the flywheel because plate 26c is provided with a plurality of driving lugs 101 which are slidably associated with recesses 102 formed in flange 95. Lugs 101 are preferably three in number and are disposed 120° apart intermediate the three centrifugal weight assemblies. It is also unnecessary to employ the retracting spring assembly shown in Figure 2 of the drawings because driving lugs 101 are apertured and have bolts 53a slidably associated therewith, which are tapped directly into base plate 19c. A compression spring 52a encircles each bolt 53a and the retracting spring assemblies function in exactly the same manner as the retracting spring assemblies previously described.

In Figures 6, 7 and 8 the fulcrums 44 have been shown as spaced slightly inwardly of the apex of the dihedral angle of the base plate in order to facilitate the disclosure.

It is to be understood that the automatic plate 26c may be of the form illustrated in Figures 4 and 5 or it may assume the form shown in Figure 1 of the drawings.

In Figure 10 I have illustrated a modified manner in which the base plate 19d may be secured to flywheel 10. With continued reference to this figure, the flywheel is machined or otherwise formed to provide an inwardly facing piloting surface 18a and a flat bearing surface 17a. Base plate 19d snugly fits within piloting surface 18a and abuts surface 17a and may be secured in place by screws in accordance with Figure 1.

In this form of the invention it will be observed that cover 24 is secured directly to the flywheel outwardly of plate 19d by means of cap screws 25. This form of the invention functions in a manner similar to those previously described.

In Figure 11 I have shown a modified form of retracting spring assembly. Threaded into ears provided on plate 26, are a plurality of shouldered pins 104 and they are encircled by retracting springs 105. Springs 105 react against fingers 106 struck from the pressed metal cover 24a. Springs 105 urge automatic plate 26 to the left and hence function in a manner similar to springs 54 of Figure 2. The openings 107 formed by striking fingers 106 from the clutch cover provide for ventilation and removal of clutch facing material freed during operation of the clutch.

In connection with Figures 6, 7 and 8, it should be observed that the boss or flange formed on the plate materially stiffens it and distributes the pressure exerted upon it by the weight levers over a large area of the plate and this feature of the invention per se may be used in other forms of clutches, for instance clutches wherein plate 19 is an actual frictional driving plate and plate 26 is a reaction plate and the appended claims are intended to cover the invention when it assumes these forms.

In connection with all the forms of invention disclosed, it is to be understood that if desired the base plate may be secured directly to the flywheel without performing any machining operation upon it at all. If this is done with the form of invention shown in Figure 1, a comparatively larger annular space will be provided inwardly of the base plate. This space may be utilized if desired to accommodate a modified form of automatic plate having stiffening flanges and/or ribs on its back surface inwardly of the base plate, for preventing the plate from undergoing distortion in response to application of forces thereto by the centrifugal weights. On the other hand the entire face of the flywheel may be machined down flush with surface 17 to provide an annular spacer for a ribbed or flanged automatic plate, and in Figure 1A I have illustrated a structure of this character wherein flywheel 10 is provided with a flat surface 17a to which base plate 19d having a beveled inner edge 109 is secured.

Automatic plate 26b is of modified form and is provided with a plurality of chordally disposed ribs 110 and a plurality of radially disposed ribs 111 for stiffening it. If desired, ribs 110 may assume the form of annular flanges.

It is accordingly, apparent that ribs 110 and 111 materially stiffen the automatic plate and prevent it from undergoing distortion in response to the clutching forces exerted upon the plate by portions 43 of levers 42.

The invention may be embodied in other specific forms without departing from the spirit or essential characteristics thereof. The present embodiments are therefore to be considered in all respective as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an automatic clutch, in combination with the flywheel of an automotive power plant, said flywheel having a substantially flat bearing face disposed normal to the axis of rotation of the flywheel, an annular base plate of disc-like form mounted on said flywheel in engagement with said bearing face and secured to said flywheel for synchronous rotation therewith, a clutch cover mounted on said base plate for synchronous rotation therewith, a driven shaft projecting into said cover, and having a driven plate mounted thereon, a driving plate located within said cover and disposed between said base plate and said driven plate and mounted for synchronous rotation with said flywheel and adapted to be moved axially into and out of engagement with said driven plate, said base plate having a plurality of accurately formed, inwardly facing, chordally disposed bearings, said bearings each providing a surface disposed parallel to said bearing face of said fly wheel and a contiguous inwardly directed surface disposed substantially normal to said first-named surface and cooperating therewith to define a dihedral angle, a plurality of centrifugally operable weight levers having radially directed foot portions providing knife-edge fulcrums in fulcrumming cooperating with said bearings and engaging said driving plate, and resilient means for yieldingly clamping the foot portions of said levers between said bearings and said driving plate, said weight levers being automatically operable to move said driving plate away from said flywheel against the action of said resilient means when said flywheel attains a predetermined rotative speed, said base plate being of greater diameter than said driving plate; and means for securing the margin of said cover to said base plate, whereby the clutch may be completely assembled at the factory, tested, and shipped as a complete unit.

2. In a clutch, in sub-combination, a first plate and a second plate of generally annular form mounted for synchronous rotation about a common axis and adapted to undergo relative axial movement, resilient means for yieldingly urging said plates toward each other, said first plate being of a diameter considerably greater than said second plate and having a plurality of axially extending bosses provided thereon which project toward said second plate, said bosses cooperating with said first plate to define a plurality of chordally disposed inwardly facing dihedral angles, and a plurality of centrifugally operable levers for effecting separational movement of said plates when they attain a predetermined rotational speed, said levers each having a radially directed portion seating against said first plate and providing a knife-edge fulcrum seating in the apex of each of said dihedral angles, said radially directed portions of said levers also seating against said second plate and being clamped between said plates by said resilient means, said second plate having a straight chordally disposed outer edge adjacent each of said levers, said levers extending past the periphery of said second plate in close proximity to the chordally disposed outer edges thereof and carrying centrifugal masses at their free ends, and abutment means for preventing said levers from shifting chordally with respect to said plates, said levers being operable to automatically rock outwardly about their knife edges as axes when said plates attain a predetermined rotational speed.

3. The clutch structure set forth in claim 2, wherein said second plate is provided with recesses in the periphery thereof opening into said chordally disposed outer edges, and said radially directed portions of said levers seat in said recesses, the side walls of said recesses cooperating with the sides of said levers and constituting said abutment means for preventing said levers from shifting chordally with respect to said plates.

4. The clutch structure set forth in claim 2, wherein said abutment means comprises an outwardly extending surface provided on said second plate at either end of each of the chordally disposed outer edges thereof, said surfaces being disposed substantially normal to the surfaces of said plates and cooperating with the sides of said levers to prevent them from shifting chordally with respect to said plates.

5. The clutch structure set forth in claim 2, wherein said first plate is provided with a plurality of secondary bosses disposed inwardly of said first named bosses and cooperating with the radially directed portions of said levers for preventing them from shifting inwardly with respect to said first plate.

6. The clutch structure set forth in claim 2, wherein said second plate is provided with recesses in the periphery thereof opening into said chordally disposed outer edges and said radially directed portions of said levers seat in said recesses, thereby allowing said plates to lie in close proximity to each other with said second plate resting within the bosses of said first plate, and wherein said first plate is provided with a plurality of secondary bosses disposed inwardly of said first named bosses and cooperating with the radially directed portions of said weights for preventing them from shifting inwardly with respect to said first plate and also seating in said recesses and cooperating with the side walls thereof for coupling said plates together for synchronous rotation.

7. In a clutch, a first plate of annular form and having a flange provided on one face thereof, said flange being disposed substantially normal to the face of said plate and having a plurality of recesses provided therein, a second plate nested within said flange and having a plurality of driving lugs projecting into the recesses of said flange and coupling said plates for synchronous rotation, said flange also being provided with a plurality of flat surfaces facing the axis of rotation and merging with the face of said first plate along straight lines to define a plurality of dihedral bearings, and a plurality of centrifugal levers having foot portions disposed between said bearings and said second plate and operable to force said plates apart when they attain a predetermined rotational speed, said levers projecting away from said first plate between said flange and the outer periphery of said second plate and carrying weight masses at their free ends.

8. The clutch structure set forth in claim 7, wherein said driving lugs are provided with axially directed apertures and a stud member slidably extends through each aperture and is secured to said first plate, together with spring means bearing against said driving lugs and acting upon said studs to resiliently urge said plates toward each other.

9. A unitary clutch assembly adapted to be secured as a unit to the flywheel of an automotive engine, comprising a hollow housing having a closed end and an open end, a base plate secured to the margin of said housing and partially closing the open end thereof, driving and driven clutch plates mounted for engagement and disengagement within said housing and located adjacent the open end thereof, a plurality of centrifugally operable weight levers in said housing fulcrumming against said base plate and operable to force said plates into engagement when said housing attains a predetermined speed, said weight levers extending axially of the housing between the inner wall of said housing and the periphery of said clutch plates and having weighted portions at their free ends located between said closed end of said housing and said clutch plates, resilient means disposed between the closed end of said housing and acting upon said clutch plates and tending to produce clutch engagement, a throwout mechanism for controlling said clutch plates against the action of said resilient means, comprising a plurality of axially directed members secured to one of said clutch plates, the weighted portions of said levers extending inwardly adjacent said members and being bifurcated so as to embrace the latter.

10. The clutch structure set forth in claim 9, wherein the weighted portions of said weight levers are provided with an outwardly facing abutment surface adapted to cooperate in abutting relationship with the inner wall of said housing and having a radius of curvature substantially equal to the radius of curvature of said inner wall.

11. In an automatic clutch, in combination with the flywheel of an automotive power plant, said flywheel having a substantially flat bearing face disposed normal to the axis of rotation of the flywheel, an annular base plate of disc-like form mounted on said flywheel in engagement with said bearing face and secured to said flywheel for synchronous rotation therewith, a clutch cover mounted on said base plate for synchronous rotation therewith, a driven shaft projecting into said cover, and having a driven plate mounted thereon, a driving plate located within said cover and disposed between said base plate and said driven plate and mounted for synchronous rotation with said flywheel and adapted to be moved axially into and out of engagement with said driven plate, said base plate having a plurality of accurately formed, inwardly facing, chordally disposed bearings, said bearings each providing a dihedral angle, a plurality of centrifugally operable weight levers having radially directed foot portions providing knife-edge fulcrums in fulcrumming cooperation with said bearings and engaging said driving plate, and resilient means for yieldingly clamping the foot portions of said levers between said bearings and said driving plate, said weight levers being automatically operable to move said driving plate away from said flywheel against the action of said resilient means when said flywheel attains a predetermined rotative speed, said flywheel being provided with a cylindrical piloting surface tightly engaging the inner periphery of said base plate for accurately centering the same and maintaining the clutch in dynamic balance.

ROY D. BATEMAN.